US005743685A

United States Patent [19]
Piggott

[11] Patent Number: 5,743,685
[45] Date of Patent: Apr. 28, 1998

[54] CLAMPING DEVICE FOR A WORKPIECE PROCESSING MACHINE

[75] Inventor: David C. Piggott, Lakefield, Canada

[73] Assignee: Quickmill, Inc., Canada

[21] Appl. No.: 252,849

[22] Filed: Jun. 2, 1994

[51] Int. Cl.$^{6}$ ........ B23Q 3/00

[52] U.S. Cl. ........ 409/131; 269/21; 279/3; 408/76; 409/225; 409/903

[58] Field of Search ........ 409/131, 225, 409/903; 269/21; 279/3; 408/76, 1 R

[56] References Cited

U.S. PATENT DOCUMENTS

| | | | |
|---|---|---|---|
| 2,443,987 | 6/1948 | Morrison et al. | 279/3 |
| 2,730,370 | 1/1956 | Brewster | 269/21 |
| 2,946,246 | 7/1960 | Allan . | |
| 2,955,829 | 10/1960 | Brewster | 279/3 |
| 3,253,665 | 5/1966 | Schienle . | |
| 4,357,006 | 11/1982 | Hayes . | |
| 4,582,460 | 4/1986 | Silverberg et al. . | |
| 4,587,873 | 5/1986 | Gerber | 269/21 |
| 4,669,226 | 6/1987 | Mandler . | |
| 4,723,766 | 2/1988 | Beeding . | |
| 4,795,518 | 1/1989 | Meinel et al. | 279/3 |
| 5,110,239 | 5/1992 | Riley . | |
| 5,133,824 | 7/1992 | Huberts et al. . | |
| 5,141,212 | 8/1992 | Beeding . | |
| 5,177,857 | 1/1993 | Ito . | |
| 5,222,719 | 6/1993 | Effner . | |
| 5,226,636 | 7/1993 | Nenadic et al. | 1/1 |
| 5,249,343 | 10/1993 | Grosso et al. . | |
| 5,281,297 | 1/1994 | Lee . | |

*Primary Examiner*—Daniel W. Howell
*Attorney, Agent, or Firm*—Thomas A. O'Rourke

[57] ABSTRACT

Disclosed herein is a clamping device comprising a workpiece-engaging portion including a workpiece-engaging surface; sealing means for sealing the workpiece-engaging portion with the workpiece; the sealing means including a first resilient member arranged to seal between the workpiece-engaging surface and the workpiece, wherein the sealing means, the workpiece-engaging portion and the workpiece collectively form a first chamber; vacuum supply means for supplying a vacuum to the first chamber to draw together the workpiece and the workpiece-engaging portion; and pressure supply means for applying a pressure to the first resilient member to force the first resilient member against the workpiece-engaging portion and the workpiece. Also disclosed is a method for clamping a workpiece to a processing machine as well as a workpiece processing machine incorporating the clamping device.

21 Claims, 5 Drawing Sheets

CLAMPING DEVICE FOR A WORKPIECE PROCESSING MACHINE

BACKGROUND OF THE INVENTION

1. Field of the Invention

The present invention relates to workpiece processing machines and more particularly to methods and devices for clamping workpieces thereto.

2. Description of the Related Art

Workpiece processing machines such as milling machines are commonly found in modern metal machining facilities. One type of milling machine is a gantry type having a large workpiece receiving bed and a tool driver positioned above the bed with three axes of movement.

Commonly, the work piece is clamped to the bed by a number of clamps bolted into selected locations on the bed. In some cases, special fixtures are welded to the workpiece in order to use the clamps. Either technique can be a complicated and time consuming process. Yet, these clamping techniques remain as standards in industry.

It is an object of the present invention to provide obviate or mitigate these difficulties.

SUMMARY OF THE INVENTION

Briefly stated, the invention involves a device for clamping a workpiece to a workpiece processing machine, the device comprising;

a workpiece-engaging portion including a workpiece-engaging surface;

sealing means for sealing the workpiece-engaging portion with the workpiece; the sealing means including a first resilient member arranged to seal between the workpiece-engaging surface and the workpiece, wherein the sealing means, the workpiece-engaging portion and the workpiece collectively form a first chamber;

vacuum supply means for supplying a vacuum to the first chamber to draw together the workpiece and the workpiece-engaging portion; and pressure supply means for applying a pressure to the first resilient member to force the first resilient member against the workpiece-engaging portion and the workpiece.

In another aspect of the present invention, there is provided a method for clamping a workpiece to a workpiece processing machine, comprising the steps of:

providing a workpiece-engaging portion including a workpiece-engaging surface;

locating a workpiece on the workpiece-engaging surface;

sealing the workpiece-engaging portion with the workpiece, the step of sealing further including the step of providing a first resilient member to seal between the workpiece-engaging surface and the workpiece so that the workpiece-engaging portion and the workpiece collectively form a first chamber;

providing a supply of vacuum to the first chamber to draw together the workpiece and the workpiece-engaging portion; and providing a supply of pressure to the first resilient member to force the first resilient member against the workpiece-engaging portion and the workpiece.

In still another aspect of the present invention, there is provided a workpiece processing machine comprising;

a bed;

means for clamping a workpiece to the bed, including at least one workpiece-engaging portion having a workpiece-engaging surface;

sealing means for sealing the workpiece-engaging portion with the workpiece, the sealing means including a first resilient member arranged to seal between the workpiece-engaging surface and the workpiece, wherein the workpiece, the sealing means and the workpiece-engaging portion collectively form a first chamber;

vacuum supply means for supplying a vacuum to the first chamber to draw together the workpiece and the workpiece-engaging portion; and pressure supply means for applying a pressure to the first resilient member to force the first resilient member against the workpiece and the workpiece-engaging portion.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Referring to the figures, there is provided a workpiece processing machine in the form of a gantry type milling machine 10 having a workpiece-receiving bed 12 and a tool driver 14 located above the bed and operable with three axes of movement.

Figure 1:
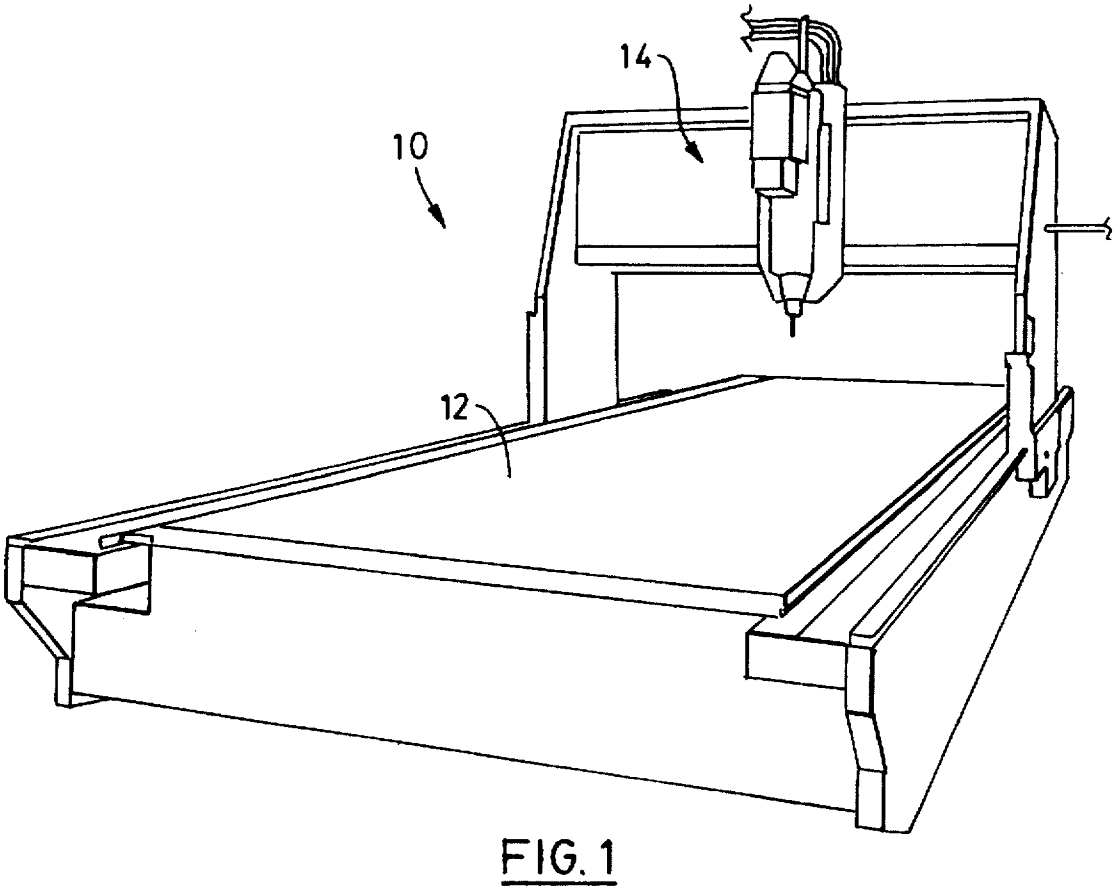
FIG. 1 is a perspective view of a gantry type milling machine.
Figure 2:
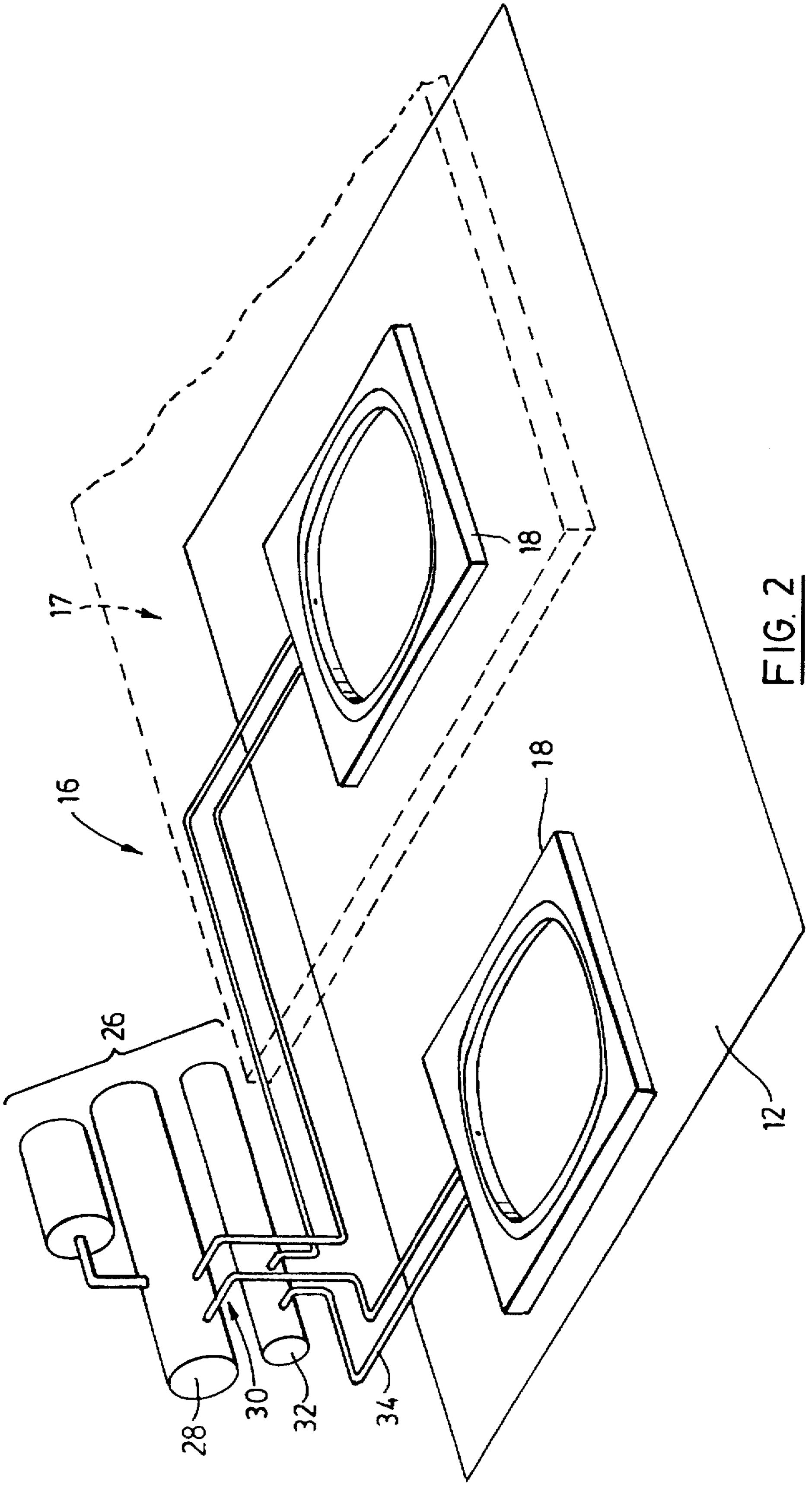
FIG. 2 is a perspective view of a clamping device for the milling machine of FIG. 1.
Figure 4:
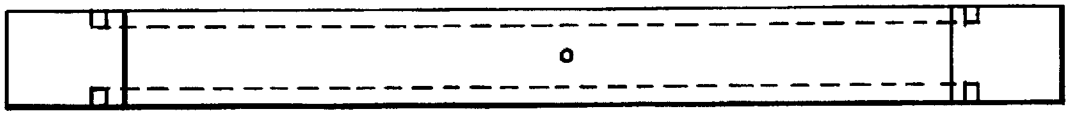
FIG. 4 is a side view of one element of the device illustrated in FIG. 2.
Figure 5:
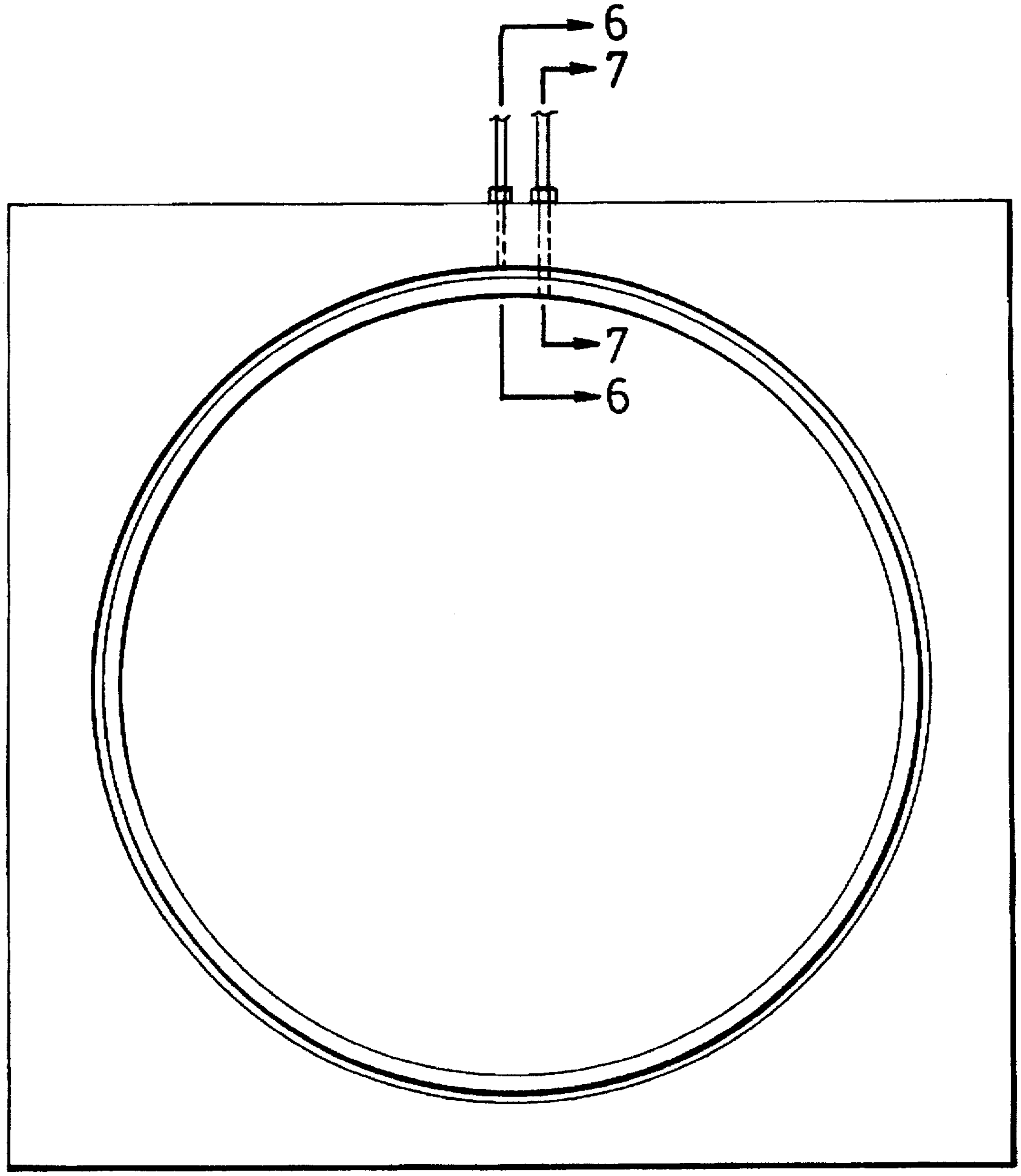
FIG. 5 is a plan view of the element illustrated in FIG. 4.
Figure 3:
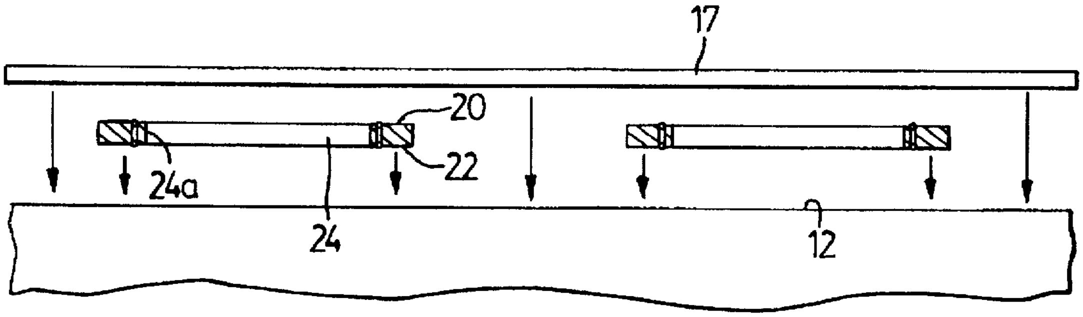
FIG. 3 is a side view of a portion of the device illustrated in FIG. 2.

Referring to FIG. 2, there is provided a device 16 for clamping a workpiece shown at 17 to the bed 12 of the milling machine 10. As will be described, the device 16 includes a pair of sandwich members 18. As shown in FIG. 3, each sandwich member 18 has a pair of opposite surfaces including a workpiece-engaging surface 20 and a bed-engaging surface 22. An aperture 24 is formed in the sandwich member and extends between the workpiece-engaging and the bed-engaging surfaces 20 and 22 respectively. The aperture is further provided with a periphery shown at *24a*.

A sealing means is provided for sealing the periphery *24a* when the workpiece-engaging and the bed-engaging surfaces are engaged with the workpiece and bed respectively. In the embodiment shown in the figures, this sealing means is in the form of a first resilient member arranged to seal between the workpiece-engaging surface and the workpiece and a second resilient member arranged to seal between the bed-engaging surface and the bed. In this manner, the sealing means, the sandwich member, the bed and the workpiece form a first chamber.

Referring to FIG. 2, a supply means is also provided at 26 to supply both a vacuum and a pressure to the device 16. The supply means includes a vacuum supply 28 which is in fluid communication with each of the first chambers by way of a number of vacuum lines, one of which is shown at 30. As will be explained, the vacuum supply is arranged to draw the workpiece, the sandwich member and the bed together.

The supply means also includes a pressure supply 32 which is in fluid communication with each of the first and second resilient members by way of a number of pressure lines, one of which is shown at 34. As will be explained, the pressure supply means is arranged to apply a pressure to the first and second resilient members to force the first resilient member against the sandwich member and the workpiece and to force the second resilient member against the sandwich member and the bed.

Figure 6:
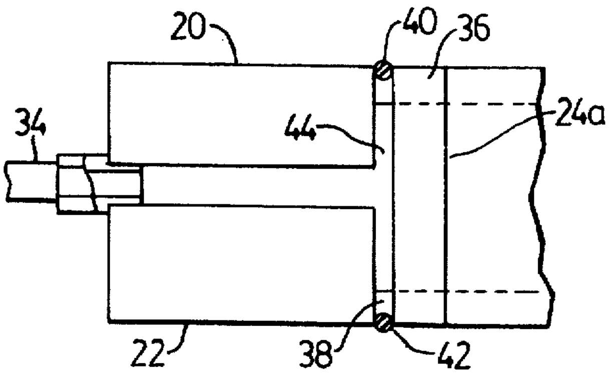
FIG. 6 is a sectional view taken on line 6—6 of FIG. 5.
Figure 3A:
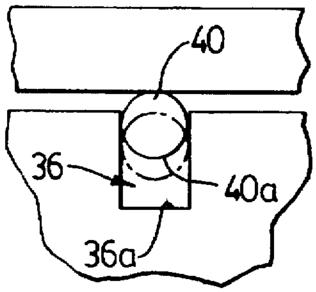
**FIG. 3*a* is a sectional view of another portion of the device illustrated in FIG. 2** in an operative position.
Figure 7:
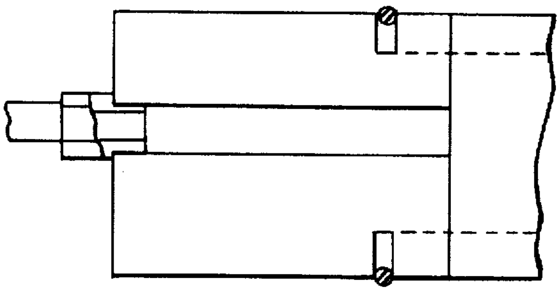
FIG. 7 is a sectional view taken on line 7—7 of FIG. 5.

Referring more particularly to FIGS. 6 and 7, the sandwich member further includes a first recess 36 formed adjacent the periphery 24*a* in the workpiece-engaging surface 20 and a second recess 38 formed adjacent the periphery 24*a* in the bed-engaging surface 22. In this case, the first and second resilient members are in the form of o-rings 40 and 42 respectively and each is engaged with a respective recess 36 and 38. Furthermore, a passage 44 is formed between the recesses 36 and 38 to join with the pressure line 34 to form collectively a second chamber. More particularly, as shown in FIG. 3*a*, the second chamber is formed by the recess 36 having an inner surface portion 36*a* and an exposed outer surface 40*a* on the resilient member which is exposed to the inner surface portion 36*a*.

The there should be a slight 'squeeze' between the o-ring and the recess allowing the second chamber to be sealed while permitting the o-ring to travel outwardly under the influence of the pressure to engage the workpiece or the bed as the case may be. For example, a prototype of the present embodiment makes use of a recess having a cross sectional width of 0.200 inches while each o-ring has a diameter of 0.207 inches, giving a squeeze tolerance of 3.4 percent. This is contrasted with conventional o-ring squeezing tolerances of up to 20 percent. In other words, the o-ring must be able to move freely in the recess while be capable of sealing against the walls thereof.

In use, the sandwich members are placed on the bed of the milling machine, with the vacuum and pressure lines joined with the first and second chambers respectively. The workpiece is then installed on the sandwich members. It will be understood that, while only two sandwich members are shown in the figures, any number of sandwich members may be provided depending on the dimensions of both the sandwich members and the workpiece. For example, three rows of two sandwich members each may provide sufficient support beneath the workpiece to prevent the workpiece from shifting during the milling operation.

Once the workpiece is installed, the vacuum and pressure supplies are activated drawing a vacuum inside the first chamber and a establishing a pressure inside the second chamber. As the level of vacuum increases in the first chamber (which for example may be at a level of 10 pounds per square inch), the effective clamping force of the workpiece correspondingly increases according to the cross sectional area of the aperture multiplied by the pressure deferential between the first chamber and ambient pressure.

The pressure supply pressurizes the second chamber which causes the o-ring to be forced outwardly (for example at a pressure of 20 pounds per square inch). Had the workpiece not been in place, the pressure supply would force the o-ring out of the recess. However, with the workpiece in place, the o-ring is instead pressed against the walls of the recess as well as the surface of workpiece to take on an elliptical cross section as shown in FIG. 3*a*. In this manner, the o-ring is forced to conform with irregularities on the surface of the workpiece, such as mill-scale, a spot of weld, dirt and the like. As a result, the o-ring is able to accommodate these irregularities and enhance the seal at the periphery of the aperture and thus the first chamber. In other words, the first resilient member is movable in the recess under the action of the pressure to establish a seal between the workpiece and the resilient member, while maintaining a seal between the resilient member and the recess.

Were it not for the pressure means, the first and second resilient members may not be able to accommodate these irregularities on the workpiece (and indeed those that may exist on the bed as well), thus limiting the vacuum if any that can be established in the first chamber and thus the clamping force of the workpiece.

Figure 8:
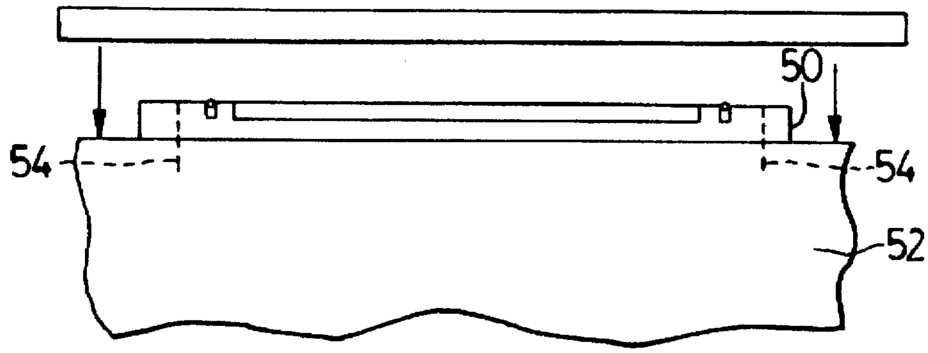
FIG. 8 is a side view of a portion of another milling machine.

If desired, the sandwich member may be equipped with just one operable sealing surface, such as the one to receive the workpiece. In this case, the other surface may lie against, but be otherwise attached to, the bed of the milling machine as shown for example in FIG. 8. In this case, the sandwich member 50 is fixed to the bed 52 by way of fasteners shown by the dashed lines at 54.

Figure 9:
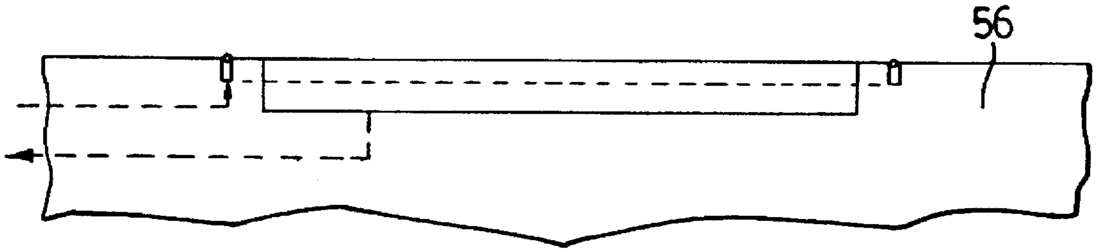
FIG. 9 is a side view of a portion of still another milling machine.

If desired, the workpiece-engaging portion may alternatively form an integral part of the bed of the milling machine itself as shown at 56 in FIG. 9.

Figure 10:
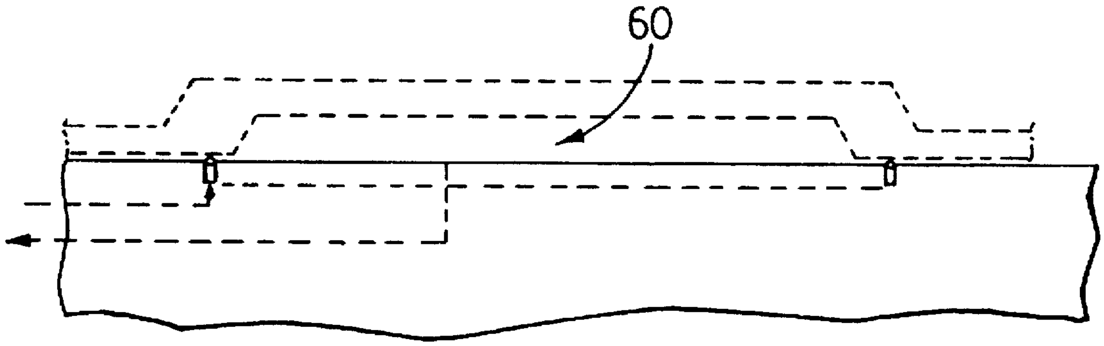
FIG. 10 is a side view of a portion of yet another milling machine.

While the above embodiments illustrate the use of an aperture and the o-ring located adjacent the aperture, the device may provide adequate clamping effect without the need of the aperture, apart from that needed to establish the vacuum in the first chamber. For example, FIG. 10 illustrates such a case where the first chamber 60 is formed in part by a concave surface on the workpiece shown in dashed lines.

Although the above embodiments discuss a clamping technique used with a milling machine, other types of workpiece processing equipment may equally benefit from the clamping technique disclosed, such as drilling, sawing and routing machines as well as others that make use of a workpiece receiving bed.

I claim:

1. A clamping device for a workpiece processing machine comprising;

a workpiece-engaging portion including a workpiece-engaging surface;

sealing means for sealing said workpiece-engaging portion with said workpiece; said sealing means including a first resilient member arranged to seal between said workpiece-engaging surface and said workpiece, wherein said sealing means, said workpiece-engaging portion and said workpiece collectively form a first chamber;

vacuum supply means or supplying a vacuum to said first chamber to draw together said workpiece and said workpiece-engaging portion;

said workpiece engaging portion further comprising a recess having an inner surface portion, said first resilient member being positioned in said recess and having an exposed surface which is exposed to said inner surface portion, said first resilient member being movable in said recess to cause said exposed surface to be spaced from said inner surface portion to form a second chamber therebetween, and pressure supply means for pressurizing said second chamber, thereby to force said first resilient member against said workpiece, wherein said first resilient member is movable under the action of said pressure to establish a seal between said workpiece and said first resilient member, while maintaining a seal between said first resilient member and said recess.

2. A device as defined in claim 1 wherein said exposed surface includes an outer surface on said resilient member.

3. A clamping device for a workpiece processing machine comprising;

a workpiece-engaging portion including a workpiece-engaging surface;

sealing means for sealing said workpiece-engaging portion with said workpiece; said sealing means including a first resilient member arranged to seal between said workpiece-engaging surface and said workpiece, wherein said sealing means, said workpiece-engaging portion and said workpiece collectively form a first chamber; said first resilient member being an o-ring;

vacuum supply means for supplying a vacuum to said first chamber to draw together said workpiece and said workpiece-engaging portion; and pressure supply means for applying a pressure to said first resilient member to force said first resilient member against said workpiece-engaging portion and said workpiece.

4. A device as defined in claim 1 wherein said machine further comprises a bed and said workpiece-engaging portion includes a sandwich member positioned on said bed.

5. A clamping device for a workpiece processing machine of the type having a bed, said clamping device comprising;

a workpiece-engaging portion including a workpiece-engaging surface; said workpiece-engaging portion further including a sandwich member positioned on said bed;

sealing means for sealing said workpiece-engaging portion with said workpiece; said sealing means including a first resilient member arranged to seal between said workpiece-engaging surface and said workpiece, wherein said sealing means said workpiece-engaging portion and said workpiece collectively form a first chamber;

vacuum supply means for supplying a vacuum to said first chamber to draw together said workpiece and said workpiece-engaging portion; and pressure supply means for applying a pressure to said first resilient member to force said first resilient member against said workpiece-engaging portion and said workpiece;

said sandwich member having a pair of opposite surfaces including said workpiece-engaging surface and a bed-engaging surface, an aperture formed in said sandwich member and extending between said workpiece-engaging and said bed-engaging surfaces, wherein said aperture has a periphery formed between said workpiece-engaging and said bed-engaging surfaces;

said sealing means further comprising a second resilient member arranged to seal between said bed-engaging surface and said bed, wherein said sealing means, said sandwich member, said bed and said workpiece collectively form said first chamber;

said vacuum supply means being further arranged to supply a vacuum to said first chamber to draw together said workpiece, said sandwich member and said bed; and said pressure supply means being further arranged to apply a pressure to both said first and second resilient members to force said first resilient member against said sandwich member and said workpiece and to force said second resilient member against said sandwich member and said bed.

6. A device as defined in claim 5 wherein said sandwich member further includes a first recess formed adjacent said periphery in said workpiece-engaging surface and a second recess formed adjacent said periphery in said bed-engaging surface, said first and second resilient members being engaged with said first and second recesses respectively, wherein said first and second resilient members and said first and second recesses collectively form a second chamber, said pressure supply means supplying pressure to said second chamber.

7. A device as defined in claim 6 wherein said first and second resilient members are o-rings.

8. A method for clamping a workpiece to a workpiece processing machine, comprising the steps of:

providing a workpiece-engaging portion including a workpiece-engaging surface;

locating a workpiece on said workpiece-engaging surface;

sealing said workpiece-engaging portion with said workpiece, said step of sealing further including the steps of:

providing a first resilient member to seal between said workpiece-engaging surface and said workpiece so that said workpiece-engaging portion and said workpiece collectively form a first chamber;

providing said workpiece engaging portion with a recess having an inner surface portion, positioning said first resilient member in said recess providing said first resilient member with an exposed surface which is exposed to said inner surface portion;

arranging said first resilient member to be movable in said recess, thereby to form a second chamber between said exposed surface and said inner surface portion, providing a supply of vacuum to said first chamber to draw together said workpiece and said workpiece-engaging portion; and pressurizing said second chamber to force said first resilient member outwardly against said workpiece, wherein said first resilient member is movable in said recess under the action of said pressure to establish an enhanced seal between said first resilient member and said workpiece, while maintaining a seal between said first resilient member and said recess.

9. A method as defined in claim 8 wherein said exposed surface includes an outer surface on said resilient member.

10. A method for clamping a workpiece to a workpiece processing machine, comprising the steps of:

providing a workpiece-engaging portion including a workpiece-engaging surface;

locating a workpiece on said workpiece-engaging surface;

sealing said workpiece-engaging portion with said workpiece, said step of sealing further including the step of providing a first resilient member in the form of an o-ring to seal between said workpiece-engaging surface and said workpiece so that said workpiece-engaging portion and said workpiece collectively form a first chamber;

providing a supply of vacuum to said first chamber to draw together said workpiece and said workpiece-engaging portion;

providing a supply of pressure to said first resilient member to force said first resilient member against said workpiece-engaging portion and said workpiece;

providing a first recess in said workpiece-engaging surface;

engaging said first resilient member with said recess and together to form therewith a second chamber;

said step of providing a supply of pressure further including the step of supplying pressure to said second chamber.

11. A method as defined in claim 8 wherein said machine further comprises a bed, wherein said step of providing a workpiece-engaging portion includes the step of providing a sandwich member for location on said bed.

12. A method for clamping a workpiece to a workpiece processing machine, comprising the steps of:

providing a workpiece-engaging portion including a workpiece-engaging surface;

locating a workpiece on said workpiece-engaging surface;

sealing said workpiece-engaging portion with said workpiece, said step of sealing further including the step of providing a first resilient member to seal between said workpiece-engaging surface and said workpiece so that said workpiece-engaging portion and said workpiece collectively form a first chamber;

providing a supply of vacuum to said first chamber to draw together said workpiece and said workpiece-engaging portion;

providing a supply of pressure to said first resilient member to force said first resilient member against said workpiece-engaging portion and said workpiece;

providing a first recess in said workpiece-engaging surface;

engaging said first resilient member with said recess and together to form therewith a second chamber;

said step of providing a supply of pressure further including the step of supplying pressure to said second chamber;

said method further comprising the steps of:

providing a pair of opposite surfaces on said sandwich member including a workpiece-engaging surface and a bed-engaging surface;

forming an aperture in said sandwich member to extend between said workpiece-engaging and said bed-engaging surfaces, wherein said aperture has a periphery formed on both said workpiece-engaging and said bed-engaging surfaces;

arranging said first resilient member to seal between said workpiece-engaging surface and said workpiece, providing a second resilient member to seal between said bed-engaging surface and said bed, wherein said sealing means, said sandwich member, said bed and said workpiece collectively form a first chamber;

providing a supply of vacuum to said first chamber to draw together said workpiece, said sandwich member and said bed; and providing a supply of pressure to both said first and second resilient members to force said first resilient member against said sandwich member and said workpiece and to force said second resilient member against said sandwich member and said bed.

13. A method as defined in claim 12 further comprising the steps of:

providing a first recess adjacent said periphery in said workpiece-engaging surface;

providing a second recess adjacent said periphery in said bed-engaging surface;

engaging said first and second resilient members with said first and second recesses respectively, wherein said first and second resilient members and said first and second recesses collectively form a second chamber;

said step of providing a supply of pressure further including the step of supplying pressure to said second chamber.

14. A method as defined in claim 13 wherein said first and second resilient members are o-rings.

15. A workpiece processing machine comprising;

a bed;

means for clamping a workpiece to said bed, including at least one workpiece-engaging portion having a workpiece-engaging surface;

sealing means for sealing said workpiece-engaging portion with said workpiece, said sealing means including a first resilient member arranged to seal between said workpiece-engaging surface and said workpiece, wherein said workpiece, said sealing means and said workpiece-engaging portion collectively form a first chamber;

vacuum supply means for supplying a vacuum to said first chamber to draw together said workpiece and said workpiece-engaging portion;

said workpiece engaging portion further comprising a recess having an inner surface portion, said first resilient member being positioned in said recess and having an exposed surface which is exposed to said inner surface portion, said first resilient member being movable in said recess to cause said exposed surface to be spaced from said inner surface portion to form a second chamber therebetween, pressure supply means for pressurizing said second chamber, thereby to force said first resilient member against said workpiece, wherein said first resilient member is movable under the action of said pressure to establish a seal between said workpiece and said first resilient member, while maintaining a seal between said first resilient member and said recess.

16. A machine as defined in claim 15 wherein said exposed surface includes an outer surface on said resilient member.

17. A workpiece processing machine comprising;

a bed;

means for clamping a workpiece to said bed, including at least one workpiece engaging portion having a workpiece-engaging surface;

sealing means for sealing said workpiece-engaging portion with said workpiece, said sealing means including a first resilient member arranged to seal between said workpiece-engaging surface and said workpiece, wherein said workpiece, said sealing means and said workpiece-engaging portion collectively form a first chamber; said first resilient member being an o-ring;

vacuum supply means for supplying a vacuum to said first chamber to draw together said workpiece and said workpiece-engaging portion; and pressure supply means for applying a pressure to said first resilient member to force said first resilient member against said workpiece and said workpiece-engaging portion;

said workpiece-engaging portion further including a first recess formed in said workpiece-engaging surface wherein said first resilient member is engaged with said recess and together therewith forms a second chamber, said pressure supply means supplying pressure to said second chamber.

18. A machine as defined in claim 15 wherein said workpiece-engaging portion includes a sandwich member mounted on said bed.

19. A workpiece processing machine comprising;

a bed;

means for clamping a workpiece to said bed, including at least workpiece-engaging portion having a workpiece-engaging surface; said workpiece-engaging portion including a sandwich member mounted on said bed;

sealing means for sealing said workpiece-engaging portion with said workpiece, said sealing means including a first resilient member arranged to seal between said workpiece-engaging surface and said workpiece, wherein said workpiece, said sealing means and said workpiece-engaging portion collectively form a first chamber;

vacuum supply means for supplying a vacuum to said first chamber to draw together said workpiece and said workpiece-engaging portion; and pressure supply means for applying a pressure to said first resilient member to force said first resilient member against said workpiece and said workpiece-engaging portion said sandwich member having a pair of opposite surfaces including a workpiece-engaging surface and a bed-engaging surface, an aperture formed in said sandwich member and extending between said workpiece-engaging and said bed-engaging surfaces, wherein said aperture has a periphery formed on both said workpiece-engaging and said bed-engaging surfaces;

said first resilient member being arranged to seal between said workpiece-engaging surface and said workpiece, said sealing means further comprising a second resilient member arranged to seal between said bed-engaging surface and said bed, wherein said sealing means, said sandwich member, said bed and said workpiece collectively form a first chamber;

said vacuum supply means being further arranged to supply a vacuum to said first chamber to draw together said workpiece, said sandwich member and said bed; and said pressure supply means being further arranged to apply a pressure to both said first and second resilient members to force said first resilient member against said sandwich member and said workpiece and to force said second resilient member against said sandwich member and said bed.

20. A machine as defined in claim 19 wherein said sandwich member further includes a first recess formed adjacent said periphery in said workpiece-engaging surface and a second recess formed adjacent said periphery in said bed-engaging surface, said first and second resilient members being engaged with said first and second recesses respectively, wherein said first and second resilient members and said first and second recesses collectively form a second chamber, said pressure supply means supplying pressure to said second chamber.

21. A machine as defined in claim 20 wherein said first and second resilient members are o-rings.

* * * * *